(No Model.) 3 Sheets—Sheet 1.

E. SHAW.
PREPARING SUGAR FOR CONFECTIONERY.

No. 551,655. Patented Dec. 17, 1895.

Witnesses:
J. C. Wilson
Percy C. Bowen

Inventor:
Edward Shaw,
By Whitman Wilkinson,
Attorneys.

(No Model.) 3 Sheets—Sheet 2.

E. SHAW.
PREPARING SUGAR FOR CONFECTIONERY.

No. 551,655. Patented Dec. 17, 1895.

Witnesses:

Inventor
Edward Shaw,
By Whitman & Wilkinson,
Attorneys.

(No Model.) 3 Sheets—Sheet 3.
E. SHAW.
PREPARING SUGAR FOR CONFECTIONERY.

No. 551,655. Patented Dec. 17, 1895.

Witnesses
Jno. H. Holt
Percy C. Bowen

Inventor
Edward Shaw,
by Whitman & Wilkinson,
Attorneys

UNITED STATES PATENT OFFICE.

EDWARD SHAW, OF BRISTOL, ENGLAND.

PREPARING SUGAR FOR CONFECTIONERY.

SPECIFICATION forming part of Letters Patent No. 551,655, dated December 17, 1895.

Application filed August 27, 1894. Serial No. 521,447. (No model.) Patented in England December 23, 1893, No. 24,742, January 30, 1894, No. 1,953, and February 8, 1894, No. 2,732.

*To all whom it may concern:*

Be it known that I, EDWARD SHAW, a subject of the Queen of Great Britain and Ireland, residing at Bristol, England, have invented certain Improvements in Boiling Sugar and Glucose, either Separately or Mixed, and Apparatus Therefor, (for which I have obtained Letters Patent of Great Britain, No. 24,742, dated December 23, 1893, No. 1,953, dated January 30, 1894, and No. 2,732, dated February 8, 1894,) of which the following is a specification.

This invention has reference to boiling sugar which has been dissolved in water to fit it for use, as is well understood, in the manufacture of sweetmeats and kindred uses. The sugar, as heretofore, may or may not be mixed with glucose.

Glucose alone may, under this invention, be fitted for use as a substitute for sugar in the manufacture of sweetmeats and for other purposes.

Under this invention the liquid to be boiled, whether it be dissolved sugar or glucose, or a mixture of the two, is forced under pressure through a metallic coil contained in a suitable vessel charged with steam, hot air, or other suitable heating agent, the temperature of which is sufficiently high to convert the water in the liquid into vapor and thus separate it, but not high enough to prejudicially affect the product. The temperature is varied according to duration of exposure. From the coil the liquid and vapor are conducted to a chamber in which separation of the vapor from the sirup is completed and from which chamber the vapor passes out through an escape-pipe, and the sirup is drawn off onto the cooling-table in a dried state through a separate duct or chute. The effect of forcing the liquid rapidly through the heated coil is to remove the water in the least possible time requisite for cooking and with the minimum exposure to heat necessary.

Figures 1, 2:
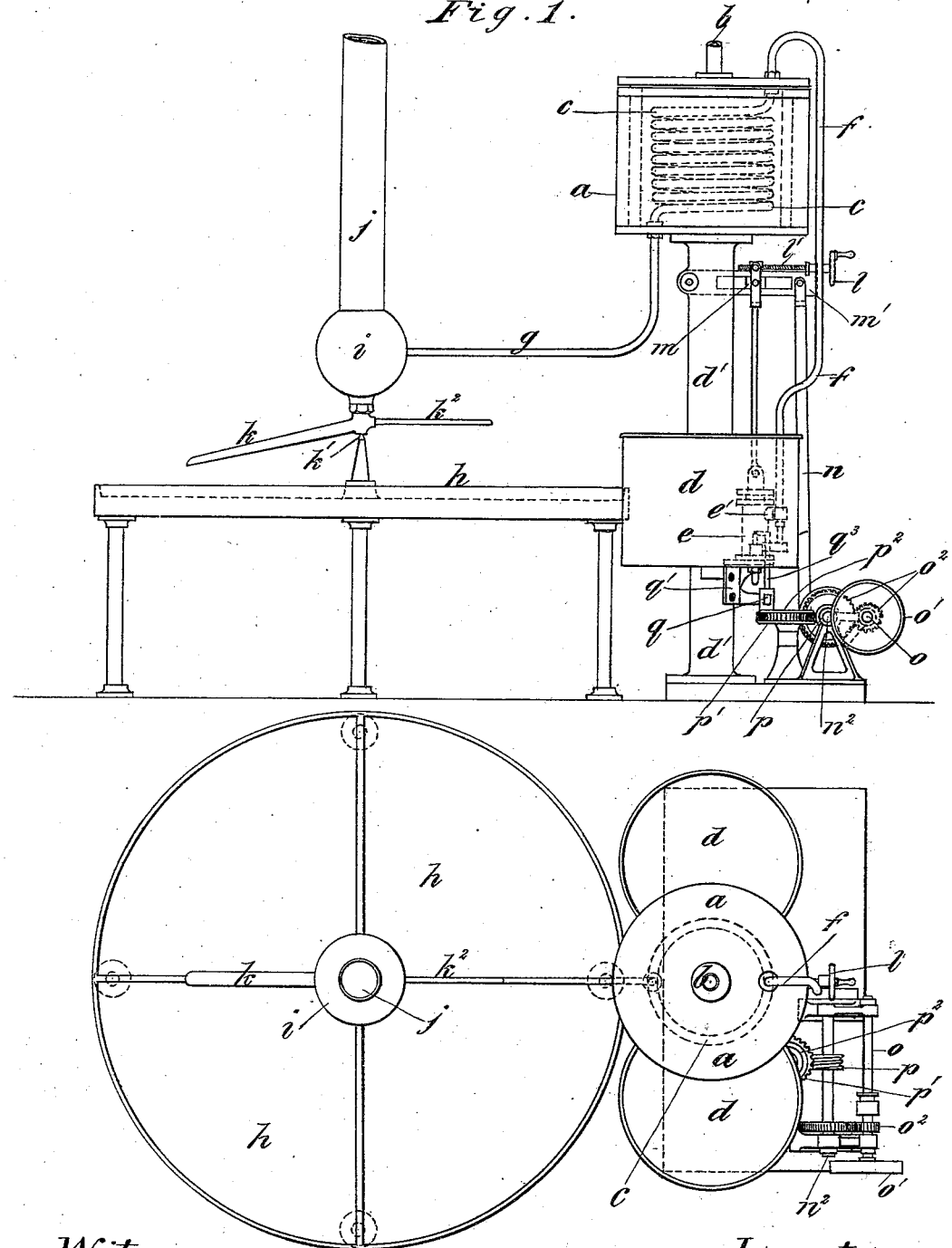
Figure 3:
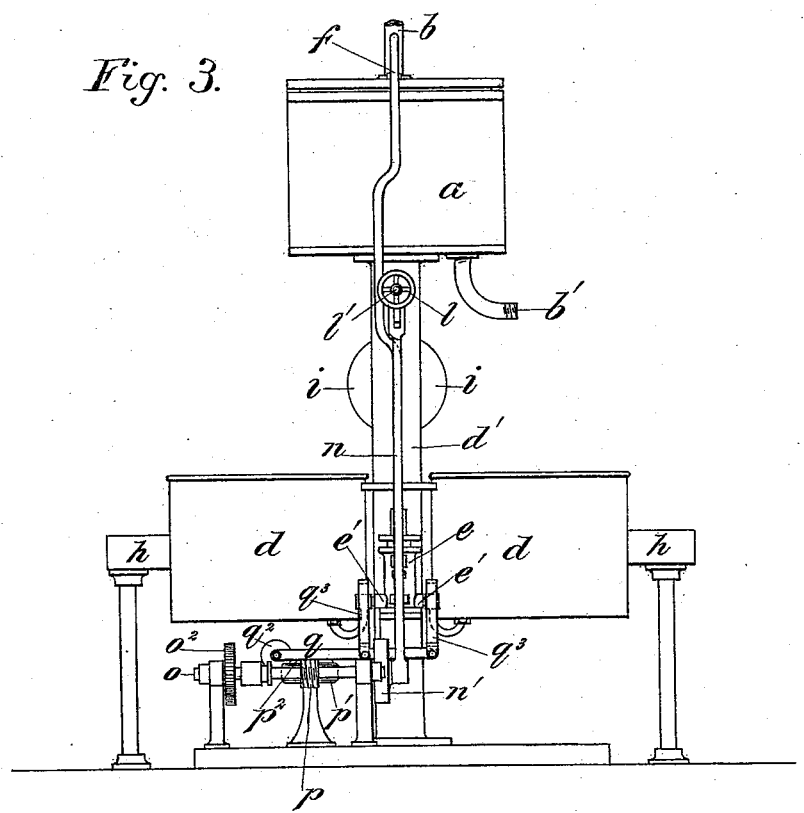
Figure 4:
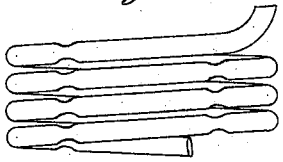
Figure 5:
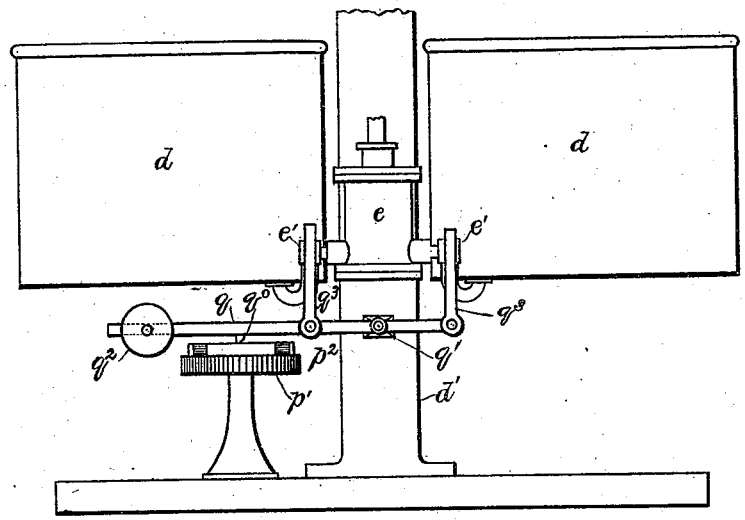
Figure 6:
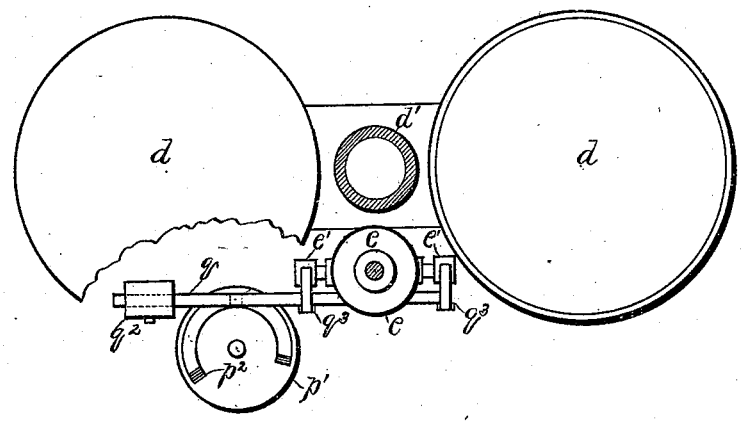

In the accompanying drawings, Figure 1 represents a side view, Fig. 2 a plan, and Fig. 3 a back view, of my machinery or apparatus constructed and arranged for boiling sirup in accordance with this invention. Fig. 4 represents a view of a portion of the heating-coil $c$. Fig. 5 is a front elevation with portions removed, showing the arrangement of cam and the lever and valve-boxes operated thereby. Fig. 6 is a plan showing parts as represented in Fig. 5.

Contained within the vessel $a$, charged, through the pipe $b$, with steam, hot air or other suitable heating agent, is a metallic coil $c$.

$b'$ is the outlet for the steam or heating agent employed in the vessel $a$.

The liquid to be boiled, whether it be dissolved sugar or dissolved glucose or a mixture of the two, is charged into the pans $d$, whence it is pumped through suitable suction-valves by the pump $e$ and is thereby forced through the pipe $f$ into and through the coil $c$. In the passage of the liquid through the coil $c$ the water is converted into vapor and thus separated from the sirup which is cooked or boiled. The sirup and vapor pass by the same delivery-pipe $g$ to the cooling-table $h$. For the purpose of completing separation of the vapor from the sirup a chamber $i$ is situated and suitably supported over the cooling-table $h$. The vapor passes off through the escape-pipe $j$ and the dried cooked sirup flows to the chute $k$ and thence onto the table $h$. The chute $k$ is capable of being turned on the pivot $k'$ by means of the handle $k^2$. By this means provision is made for directing delivery of the sirup to any compartment of the cooling-table $h$.

The stroke of the plunger of the pump $e$ is variable through the hand-wheel $l$ and screw $l'$, by means of which the slide-block $m$ can be adjusted to any point in the slotted link $m'$ which at one end is pivoted to the pillar $d'$ supporting the vessel $a$ and carrying the pans $d$. To the other end of the link $m'$ is attached one end of the connecting-rod $n$, the other end of which is attached to the disk-crank $n'$ carried on the shaft $n^2$ driven from the shaft $o$ through the pulley $o'$ and gearing $o^2$. By varying the length of stroke of the pump $e$ the delivery is controlled in volume and the temperature of the delivered sirup regulated.

Upon a shaft $n^2$ is fixed the worm $p$, which worm is geared to the worm-wheel $p'$. This shaft is shown in Figs. 1, 2, and 3, but is omitted from Figs. 5 and 6 for the sake of clearness in the drawings. On the upper face of this worm-wheel is a cam $p^2$, upon which rests the spur $q^0$ of the lever $q$, the contact between the spur and the cam being made secure by the attachment of the weight $q^2$ at the end of the lever. The lever is pivoted to a bracket at $q'$. The arms $q^3$, attached to the lever $q$, extend upward and are bent at right angles over the valve-boxes $e'$. The valves being actuated by the upward and downward motion of the arms $q^3$, as represented in Fig. 5, the lever is on top of the cam, the valve on the left being open and the one on the right being closed. When the worm-wheel has revolved one-half of a revolution farther, the lever drops from the cam and rests on the surface of the cam-wheel, closing the open port on the right and opening the one which was closed. As the rotation of the wheel $p'$ is continued, the liquid is admitted alternately into the cylinder $e$ from the tanks $d$.

Instead of being of the same diameter throughout, the coil $c$ may be made larger at some points than at others, as shown at Fig. 4, so as to facilitate separation of the vapor from the sirup.

What I claim is—

1. An apparatus for cooking sucrose or glucose, which comprises a heating coil and means for forcing the sirup through the same, an enlarged chamber connected to said coil and provided with a large pipe above the same to carry off the vapor formed, and a suitable outlet at the bottom of said chamber, a rotary chute beneath said outlet and a cooling table beneath said chute, substantially as described.

2. An apparatus for cooking sucrose or glucose, which comprises a heating coil having parts thereof contracted, as shown, and means for forcing the sirup through the same, an enlarged chamber connected to said coil and provided with a large pipe above the same to carry off the vapor formed, and a suitable outlet at the bottom of said chamber; a rotary chute beneath said outlet with a handle projecting therefrom on the opposite side of said chute, and a circular cooling table beneath said chute, substantially as and for the purposes described.

3. In an apparatus of the character described, the combination with a pair of sirup tanks and a heating coil fed therefrom, of a pump delivering sirup to said heating coils, and pipes and valves connecting each of said tanks to said pump; a weighted beam pivoted below and between said valves, a cam plate adapted to alternately raise and lower said beam, and arms connected to said beam on either side of its pivot, and adapted to operate first one valve and then the other, whereby said pump is fed alternately from one tank and then from the other, substantially as described.

In testimony whereof I have signed my name to this specification in the presence of two subscribing witnesses.

EDWARD SHAW.

Witnesses:
NICHOLAS WATTS,
CHARLES TOPHAM FRENCH.